United States Patent

[11] 3,590,160

[72] Inventor Kalju Meri
Maspeth, N.Y.

[21] Appl. No. 857,464
[22] Filed Sept. 12, 1969
[45] Patented June 29, 1971
[73] Assignee Electrospace Corporation
Bronx, N.Y.

[54] TELEPHONE ANSWERING DEVICE WITH A CONTROL FLIP-FLOP
6 Claims, 3 Drawing Figs.

[52] U.S. Cl. .......... 179/6
[51] Int. Cl. .......... H04m 1/64
[50] Field of Search .......... 179/6, 6 AC, 6 C, 6 R

[56] References Cited

UNITED STATES PATENTS

| | | | |
|---|---|---|---|
| 3,146,310 | 8/1964 | Jeffries et al. .......... | 179/6 |
| 3,293,365 | 12/1966 | Mitsui .......... | 179/6 |
| 3,310,629 | 3/1967 | Yamamoto et al. .......... | 179/6 |
| 3,337,690 | 8/1967 | Martin .......... | 179/6 |

*Primary Examiner*—Bernard Konick
*Assistant Examiner*—Raymond F. Cardillo, Jr.
*Attorney*—Friedman & Goodman

ABSTRACT: A telephone-answering device with a control transistor for controlling drive motor operation and transistor flip-flop circuitry for controlling the shift from the prerecorded announcement phase to an incoming message record phase to a standby phase. The transistor flip-flop circuitry includes a photocell and a light source between which the prerecorded announcement endless tape travels. The first shift to the incoming message record phase is controlled by the flip-flop circuitry being set to a first state by the energization of the photocell by light passing thru the endless tape. Subsequently light again reaches the photocell thru the endless tape to energize the photocell a second time. This second energization causes the flip-flop circuitry to be set a second state to cut off the control transistor to stop drive motor operation and to return the device to standby.

INVENTOR.
KALJU MERI
BY Friedman & Goodman
Attorneys

INVENTOR.
KALJU MERI

BY Friedman & Goodman
Attorneys

TELEPHONE ANSWERING DEVICE WITH A CONTROL FLIP-FLOP

BACKGROUND OF THE INVENTION

1. Field of the Invention:

This invention relates to circuitry for a telephone-answering device. More particularly, this invention relates to circuitry designed to readily enable a telephone-answering device to pass from the prerecording message phase to the incoming message record phase to standby.

2. Description of the Prior Art

There are numerous telephone-answering devices in existence. Generally speaking they are all designed to be activated into operation when the phone rings. A drive mechanism moves a tape when the incoming lines are in electrical association with the answering device. The tape is provided with a prerecorded message usually advising that the party is not present, but if the caller would dictate into the telephone his name and telephone number, the call would be returned. Means are provided at the end of the prerecord announcement phase for a record phase to go into operation. Naturally the device's amplifier must be switched into a position whereby it amplifies the caller's voice. Means must also be provided for the device to shut off and remain in a standby position for a subsequent call. Since there is no one present this must be done simply in a reliable manner. The electrical circuitry is therefore of extreme importance. It is to that function that the present invention is directed.

OBJECTS OF THE INVENTION

It is an object of this invention, therefore, to provide an effective means for a telephone-answering device to cause the device to pass through the successive prerecord announcement phase, record message phase and standby phase.

It is another object of the present invention to provide such a mechanism which is responsive to the revolutions of an endless tape provided with both a prerecorded announcement section and a record section.

It is another object of the present invention to provide the needed electrical circuitry for the above-described successive functions.

These and other objects and advantages of our invention will become apparent from the following description, accompanying drawings, and appended claims.

STATEMENT OF THE INVENTION

Broadly, this invention contemplates an improvement in a telephone-answering device equipped with means for actuating said device responsive to the ring of the telephone, a tape drive mechanism operative to drive an endless tape over a record and playback head, an amplifier adapted to amplify a prerecorded message into a telephone and a telephone message into a recorder, said tape having a prerecorded message section and a section to receive incoming recordings, the improvement of a flip-flop circuit adapted to move the device from its prerecorded announcement phase to an incoming message record phase to a standby phase which comprises a photocell, said photocell in electrical association with a first transistor of said flip-flop operable to energize a relay to shift the record playback (R/P) head from an announce track to a record track and to switch the contacts to and from said amplifier to transform it from a playout amplifier to an incoming message amplifier, said photocell disposed between said first transistor and a capacitor connected to common ground, said first transistor in electrical association with at least one additional transistor that upon completion by said endless tape of a second cycle the decrease in the resistance across the photocell will cause the transistors to cut out whereby contacts are opened deenergizing said drive means and returning said device to a standby condition.

In a particularly desirable embodiment, the present invention contemplates the above device wherein when said flip-flop transistors are cut out they cause the cutting-out of a third control transistor by transmitting a negative pulse, said control transistor adapted to be in direct electrical association with said drive means. DESCRIPTION OF THE DRAWING The present invention can be more readily understood by reference to the accompanying figures and ensuing disclosure taken in conjunction with the disclosure of copending application, Ser. No. 776,204, filed Nov. 15, 1968, which is hereby incorporated herein by reference.

DISCUSSION OF SPECIFIC EMBODIMENTS

Figure 1:
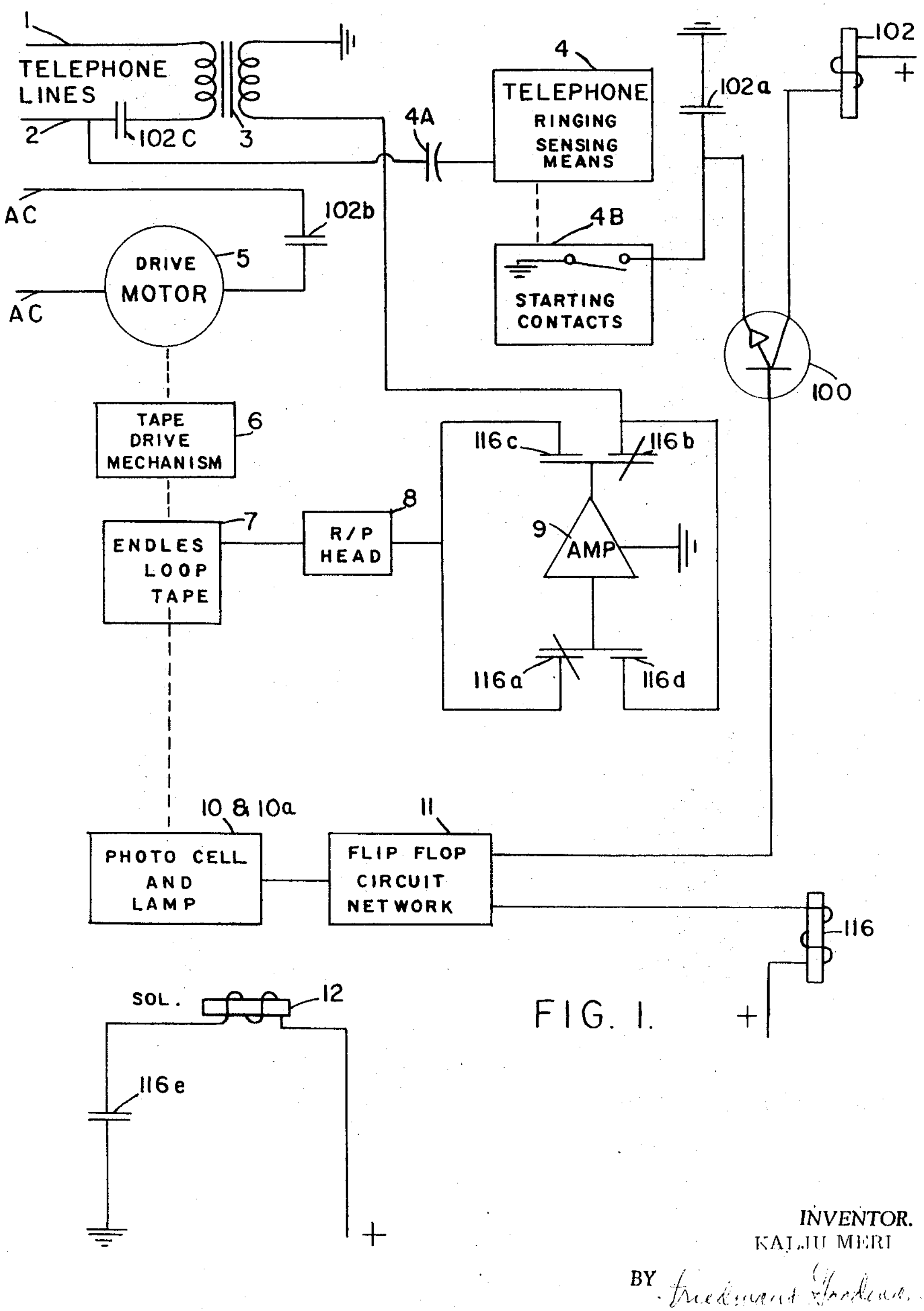
FIG. 1 is a circuit diagram in block form of the telephone-answering device of the present invention.
Figures 2, 3:
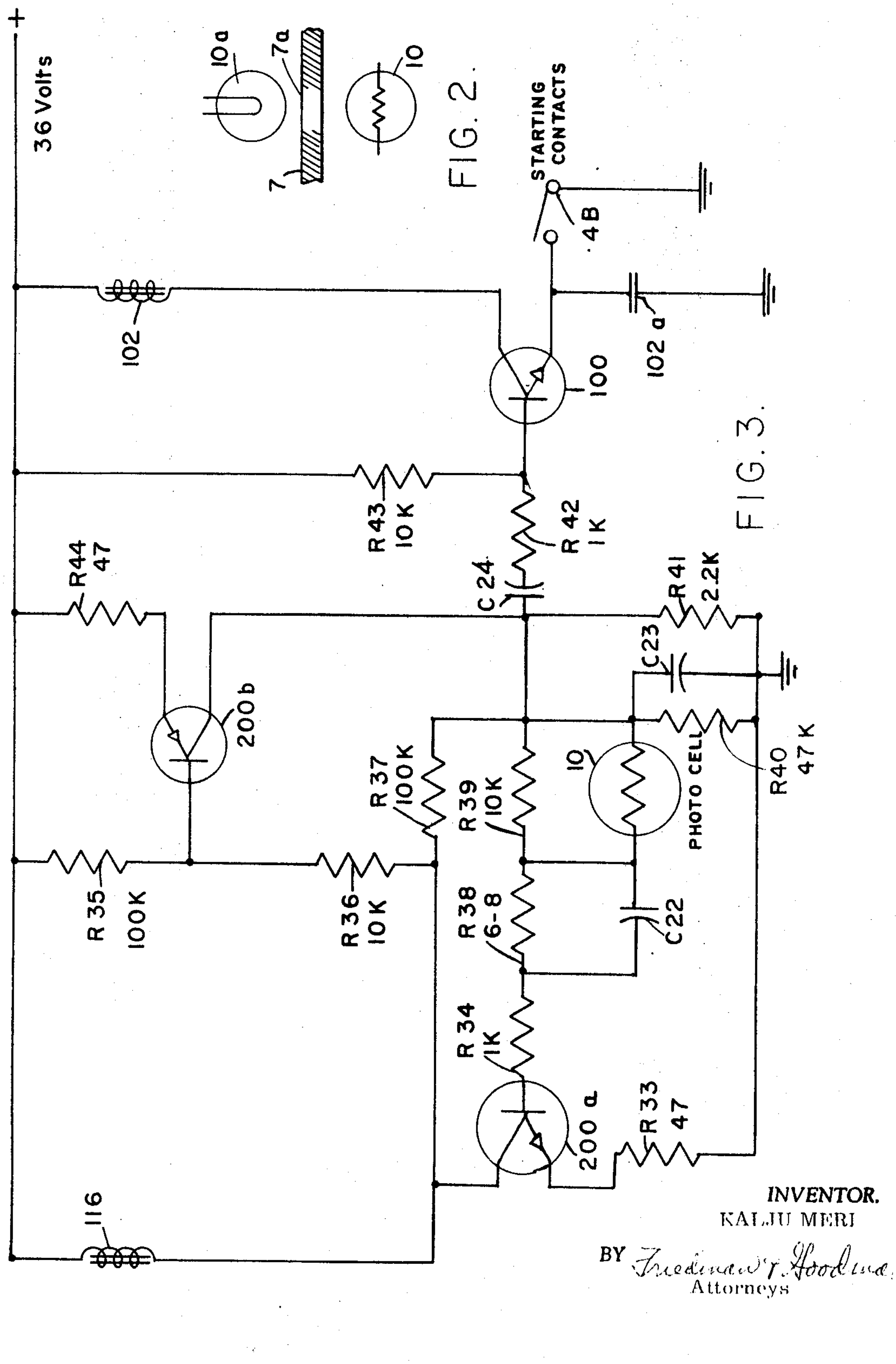
FIG. 2 is a diagram showing the announce tape endless loop, the photocell and its associated lamp.
FIG. 3 is a detailed circuit schematic of the control switching means of the present invention including the flip-flop circuitry and the control transistor 100.

A specific embodiment of the present invention is illustrated in the accompanying drawings, especially FIG. 3. The symbols "|||" and "+" are used herein to represent the ground and the positive lead from a suitable power source not shown. As clearly illustrated in FIG. 1, connected to the incoming telephone lines 1 and 2 is a transformer 3. The telephone circuit is connected to a telephone-ringing sensing means 4, this portion of the circuit further including a conventional DC blocking capacitor 4A functioning in a well understood manner to block the telephone line direct current from the telephone-ringing sensing means 4. Upon receipt of a telephone-ringing signal, the previously noted telephone-ringing sensing means 4 operates starting contacts 4B which are effective to bias a control transistor 100 into its conduct condition thereby operating relay 102. The operation of relay 102 in turn results in the closing of a first set of relay contacts 102A (located adjacent the sensing means 4), a second set of contacts 102B and also a third set of contacts 102C, with the following results: closing of contacts 102A grounds the emitter of transistor 100, thus maintaining the same in its conductive condition, closing of contacts 102B completes the circuit for the tape drive motor 5, thus rendering this motor operative, and closing of contacts 102C will seize the telephone line.

Operation of motor 5 drives the tape drive 6 rendering the endless loop tape mobile. A prerecorded announcement recorded on the tape 7 of FIG. 2 is now played out to the telephone lines via recorder playback (R/P) head 8, normally closed contacts 116A, over amplifier 9, normally closed contacts 116B to the telephone transformer 3 and out over telephone lines 1 and 2.

At the completion of the endless loop tape cycle is a transparent portion of tape 7A as seen in FIG. 2, which passes between the photocell 10 and lamp 10A triggering the photocell. The photocell triggers the flip-flop circuit network 11, which is now flipped into a conducting state operating relay 116. The flip-flop state is now such that transistor 100 is driven to further saturation. A more fully detailed circuit operating description of the photocell, flip-flop circuitry and control transistor 100 will be rendered in connection with FIG. 3.

Operation of relay 116 causes closure of contacts 116E energizing the solenoid 12. Operation of solenoid 12 shifts the R/P head 8 off the announce track onto the first message track on tape 7, all as fully described in the copending application Ser. No. 776,204 filed Nov. 15, 1968. Operation of relay 116 also shifts the amplifier 9 input connection to the telephone transformer 3 via the normally open contacts 116D, and the amplifier output connection is shifted to the recorder playback head 8 via the normally open contacts 116C. The incoming message is now fed into the amplifier and recorded on a message track on tape 7.

When the endless tape 7 completes its cycle of rotation again, the transparent portion of the tape 7A again passes between the photocell 10 and the lamp 10A, triggering the photocell which in turn triggers the flip-flop circuit 11, flopping it into a cutoff or standby state so as to bias transistor 100 into cutoff or standby condition. Cut off of control transistor 100 releases relay 102 and cut off of the flip-flop circuitry releases relay 116. As mentioned earlier, a more detailed explanation of the flip-flop and its associated circuitry will follow in conjunction with FIG. 3.

Release of relay 102 deactivates the drive motor 5 and release of relay 116 deactivates the solenoid 12. Upon deactivation of solenoid 12, the recorder playback head 8 shifts out of the message track it has been tracking and returns to track with the announce track on tape 7.

The amplifier 9 input and output is now again connected to the record playback head 8 and the telephone transformer 3, respectively, due to the release of relay 116. The device has now been returned back into its standby condition.

Referring now to FIG. 3, the designations "|||" and "+" represent the ground and positive terminals of a suitable power supply not shown.

As already mentioned earlier with reference to FIG. 1, when the phone rings the starting contacts 4B are caused to be closed by the Telephone Ringing Sensing Means 4. Closure of the starting contacts grounds the emitter of control transistor 100. Since base current is supplied to transistor 100 via resistor R43, transistor 100 conducts at the moment its emitter is grounded. Conduction of transistor 100 will operate relay 102 resulting in closure of contacts 102A. Closure of contacts 102A applies an alternate ground source to the emitter of transistor 100 maintaining the transistor conducting after the telephone ring stops and starting contacts 4B reopen.

As already mentioned earlier with reference to FIG. 1, closure of relay 102 operates the drive motor resulting in the playout of the prerecorded announcement.

During the announcement playout the photocell 10 resistance is very high, in the order of a few megohms. But when the transparent portion 7A (FIG. 2) on the endless tape 7 passes between the photocell 10 and the lamp 10A the photocell resistance will drop to a few hundred ohms. The effect of this resistance change on the flip-flop circuitry, constituting transistors 200*a* and 200*b*, will become apparent from the immediately following description.

During the announcement playout the transistor 200*a* was in cutoff condition, the collector voltage was therefore sitting at plus 36 volts. This collector voltage will result in capacitor C23 charging up to approximately 10 volts. This is due to the resistor divider network ratio consistuting R37 (100K) and R40 (47K). Now, when the photocell resistance falls to a few hundred ohms, a positive pulse from capacitor C23 will be transmitted to the base of transistor 200*a* via photocell 10, capacitor C22 and resistor R34. Transistor 200*a* is now rendered conductive, drawing collector current, and relay 116 is energized. Transistor 200*a* base current is now maintained over a circuit involving transistor 200*b* to be discussed forthwith.

Due to the conduction of transistor 200*a*, the base of transistor 200*b* is now sitting at close to ground potential, this renders transistor 200*b* conductive. Conduction of transistor 200*b* results in a high positive voltage being established at the juncture of capacitor C24, R39, and R41. This point supplies base current to saturate transistor 200*a* over R39, R38, and R34. This positive potential, at the aforementioned juncture, serves to further saturate transistor 100 and will not, therefore, adversely affect the conductivity of transistor 100. It is now evident that on the first excitation of the photocell 10 (following the announcement playout) transistor 100 continues to conduct and therefore relay 102 will remain in energized condition, maintaining the drive motor 5 operative.

Due to the closure of relay 116, solenoid 12 is energized and the amplifier is switched into the record mode as already mentioned with respect to FIG. 1. The answering apparatus is now in condition to record the incoming call.

It would be well to point out here that after the transparent portion 7A of the tape 7 passes between the photocell 10 and lamp 10A the photocell resistance assumes a very high value again, this prevents the transistor 200*a* base current from being shorted to ground over capacitor C23, the voltage across the capacitor now being very low, notwithstanding. But, as the endless loop completes its cycle of rotation for the second time the transparent portion 7A again passes between the photocell and the lamp. The photocell is sensitized and its resistance falls to a very low value again. In this condition the photocell shorts the base current of transistor 200*a* to ground. Additionally, capacitor C22 will further bias the base of transistor 200*a* in a cutoff direction. Transistor 200*a* will now cease conducting and relay 116 will become energized. Furthermore, in cutoff condition the voltage on the collector of transistor 200*a* will shoot up to plus 36 volts. This same potential will be assumed by the lower end of resistor R36 thus cutting-off transistor 200*b*. Cutoff of transistor 200*b* will shift its collector voltage down to ground potential transmitting a negative pulse to the base of transistor 100. This negative pulse will obtain for about 40 milliseconds rendering transistor 100 into cutoff condition. With transistor 100 in cutoff condition relay 102 will drop out releasing its contacts 102A, 102B and 102C. The release of these contacts removes the ground potential from the emitter of transistor 100, halts the operation of drive motor 5 and releases the telephone lines. The apparatus is now returned into standby condition.

It is clear from the above that the resulting action that takes place after the transparent portion 7A passes the photocell on the second revolution of the endless tape 7 is quite different from what takes place after the transparent portion passes the photocell on the first revolution of the endless tape 7.

What I claim is:

1. A telephone-answering apparatus for association with a telephone having instrumentalities and the necessary circuit connections thereto including a power circuit for performing an automatic telephone-answering function, a prerecorded announcement playout function, an incoming message-recording function, and control switching means for switching the apparatus from one to the other of said functions, said instrumentalities and circuit connections for performing said announcement playout and incoming message recording functions including a moveable sound carrier in the form of an endless loop and drive means for driving said endless loop, said control switching means including a control transistor, a photocell and flip-flop transistor circuitry, wherein said apparatus in response to said telephone-ringing signal renders said control transistor conductive, said control transistor in said conductive state affecting the operation of said drive means to drive said endless loop, and wherein said photocell actuation upon said loop completing a first cycle renders said flip-flop transistor circuitry into a conducting state causing the transfer of said apparatus out of said announcement playout function into said incoming message recording function and upon said loop completing a second cycle said photocell actuation this time rendering said flip-flop transistor circuitry into a cutoff state, said flip-flop in its cutoff state driving the said control transistor into a cutoff condition and thus curtailing the operation of said drive means.

2. A telephone-answering apparatus for association with a telephone having instrumentalities and the necessary circuit connections thereto including a power circuit for performing an automatic telephone-answering function, a prerecorded announcement playout function, an incoming message-recording function, and control-switching means for switching the apparatus from one to the other of said functions, said instrumentalities and circuit connections for performing said announcement playout and incoming message-recording functions including a movable sound carrier in the form of an endless loop and drive for driving said endless loop, said control-switching means including a control transistor, a photocell, flip-flop transistor circuitry, a first and second relay, wherein said apparatus in response to said telephone-ringing signal rendering said control transistor conductive, said control transistor in said conductive state energizing said first relay thereby affecting the operation of said drive means to drive said endless loop, and wherein said photocell actuation upon said loop completing a first cycle renders said flip-flop transistor circuitry into a conducting state energizing the said second relay causing the transfer of said apparatus out of said announcement playout function into said incoming message-recording function and upon said loop completing a second cycle, said photocell actuation this time rendering said flip-flop circuitry into a cutoff state deenergizing said second relay, said flip-flop in its cutoff state driving the said control transistor into a cutoff condition deenergizing the said first relay and thus curtailing the operation of said drive means.

3. A telephone-answering apparatus according to claim 1, wherein a portion of said endless loop is transparent and said control-switching means includes a lamp, said photocell actuation taking place when said transparent portion passes between said photocell and said lamp.

4. A telephone-answering apparatus for association with a telephone having instrumentalities and the necessary circuit connections thereto including a power circuit for performing an automatic telephone-answering function, a prerecorded announcement playout function, an incoming message recording function, and control-switching means for switching the apparatus from one to the other of said functions, said instrumentalities and circuit connections for performing said announcement playout and incoming message-recording functions including a movable sound carrier in the form of an endless tape loop having a transparent section thereon, tape drive means for driving said endless loop, said endless loop completing a first cycle during the announcement playout function and a second cycle during the incoming message-recording function, said endless loop travel being oriented so as to traverse between a light source and a photocell, said control-switching means including flip-flop circuitry comprising a first and second transistor, a relay in electrical association with said first transistor, said photocell connected in a circuit between said first transistor and a capacitor to common ground, said photocell rendering said flip-flop circuitry, alternately, in a conducting and cutoff condition on successive incidences of excitation of said photocell on each completion of said tape loop cycle.

5. A telephone-answering apparatus according to claim 4, wherein said control-switching means further includes a control transistor, said control transistor being capacitivly coupled to said second transistor of said flip-flop circuitry, said apparatus in response to said telephone-ringing signal rendering said control transistor conductive and wherein said flip-flop circuitry in its cutoff condition upon said second completion of said tape loop cycle drives said control transistor into a cutoff condition.

6. A telephone-answering apparatus for association with a telephone having instrumentalities and the necessary circuit connections thereto including a power circuit for performing an automatic telephone-answering function, a prerecorded announcement playout function, an incoming message-recording function, and control-switching means for switching the apparatus from one to the other of said functions, said instrumentalities and circuit connections for performing said announcement playout and incoming message-recording functions including a movable sound carrier in the form of an endless tape loop having an announce track and adjacent potential plural incoming message-recording tracks arranged side-by-side across the width of said endless tape, said announcement playout and incoming message-recording functions further including a magnetic transducer, tape drive means for driving said endless loop, said endless loop completing a first cycle during said announcement playout function and a second cycle during said incoming message-recording function, said transducer being in tracking relationship with said announce track during said first cycle and with one of said incoming message recording tracks during said second cycle, said control-switching means including a control transistor, a photocell and flip-flop transistor circuitry, wherein said apparatus in response to said telephone-ringing signal renders said control transistor conductive, said control transistor in said conductive state affecting the operation of said drive means to drive said endless loop, and wherein said photocell actuation upon said loop completing a said first cycle renders said flip-flop transistor circuitry into a conducting state causing the transfer of said apparatus out of said announcement playout function into said incoming message recording function and upon said loop completing a said second cycle, said photocell actuation this time rendering said flip-flop transistor circuitry into a cutoff state, said flip-flop in its cutoff state driving the said control transistor into a cutoff condition and thus curtailing the operation of said drive means.